United States Patent [19]

Ohbayashi et al.

[11] Patent Number: 4,859,888
[45] Date of Patent: Aug. 22, 1989

[54] CROSS FLOW TYPE COOLING FAN DEVICE

[75] Inventors: Yoshiaki Ohbayashi, Nara; Kunio Hashimoto, Higashiosaka; Katsumi Sakurai; Hiroyuki Noma, both of Yao, all of Japan

[73] Assignee: Hosiden Electronics Co., Ltd., Osaka, Japan

[21] Appl. No.: 57,894

[22] PCT Filed: Oct. 1, 1986

[86] PCT No.: PCT/JP86/00503
§ 371 Date: May 13, 1987
§ 102(e) Date: May 13, 1987

[87] PCT Pub. No.: WO87/03149
PCT Pub. Date: May 21, 1987

[30] Foreign Application Priority Data

Nov. 11, 1985 [JP] Japan .................... 60-173697

[51] Int. Cl.$^4$ ............................................ H02K 29/08
[52] U.S. Cl. ................................ 310/68 R; 310/264; 310/67 R; 417/423.14
[58] Field of Search ............. 415/52, 53 R, 54; 417/423 T; 310/68 R, 268, 67 R, 60 A, 63, 62, 264

[56] References Cited

U.S. PATENT DOCUMENTS 3,141,607  7/1964  Masters ..................... 417/423 T
4,360,751 11/1982  Arnold, Jr. et al. ............ 310/268
4,634,912  1/1987  Heyraud .................... 310/268

FOREIGN PATENT DOCUMENTS 0005404  1/1977  Japan .................... 310/264
59-169346  9/1984  Japan .
60-87651  5/1985  Japan .
2117982 10/1983  United Kingdom ............ 310/63

Primary Examiner—Pete S. Wong
Assistant Examiner—Judson H. Jones
Attorney, Agent, or Firm—Jones, Tullar & Cooper

[57] ABSTRACT

A cross flow type cooling fan device installed in the internal part of electric appliances which need cooling such as audio-amplifiers, microcomputers, word processors, copying machine, etc. The cross flow type cooling fan device is characterized in that an impeller (107) with air blowing slits formed around a hollow area in the center of a cylindrical body is rotatably supported by supporting frames (109, 110) at the ends thereof through supporting shafts (111, 112), a field magnet (121) is mounted either on a rotary side formed by the impeller (107) or the supporting shafts (111, 112) or on a stationary side formed by the supporting frames (109, 110), and an armature winding (124) is mounted confronting the aforesaid magnet for the motor, so that a rotary driving section of the impeller is constructed resulting in a cooling fan device of considerably reduced size.

10 Claims, 11 Drawing Sheets

CROSS FLOW TYPE COOLING FAN DEVICE

CROSS REFERENCE TO RELATED APPLICATION

This application is related to application Ser. No. 057,898, filed May 13, 1987 by the same inventors of the invention disclosed and claimed herein.

TECHNICAL FIELD

The present invention relates to a cross flow type cooling fan device installed in electric appliances such as audio-amplifiers, microcomputers, word processor, copying machine, etc. to discharge heat generated by electric components incorporated therein outside the electric appliances.

BACKGROUND ART

An impeller 1 used in a cross flow type cooling fan device of this type is conventionally formed by molding a synthetic resin and in which, as shown in FIG. 24, air blowing slits 3 are formed by a group of blades 4 around a hollow area 2 in the center of a cylindrical body. Air taken in radially from outside is sent through the air blowing slits 3 to cool the heat generated by the electric components. As the cooling air can be widely and planely sent out forming a laminar air flow, the impeller is particularly suitable for cooling the electric components disposed on a printed board.

However, because a motor 6 used for rotational driving of the impeller 1 is connected adjoiningly to the side of the impeller 1, a problem exists in that a space necessary for installing the cooling fan device is inevitably large, which is an obstacle in designing a compact electric appliance.

SUMMARY OF THE INVENTION

Accordingly, an object of the present invention is to provide a cross flow type cooling fan device in which a motor is incorporated, and which is reduced in size saving a space for installation.

Another object of the present invention is to provide a cross flow type fan device capable of effectively cooling a control circuit section of a brushless motor without any other cooling system even when the motor incorporated is formed into a brushless motor.

A further object of the present invention is to provide a cross flow type fan device, in which a plurality of impellers are connected in the axial direction and adjoining air blowing slits of the impellers are arranged in staggered relationship to one another to improve air blowing efficiency.

In a cross flow type cooling fan device according to the present invention, an impeller with air blowing slits formed around the hollow area in the center of a cylindrical body is rotatably supported by a supporting frame at the ends thereof through supporting shafts, a magnet for a motor is mounted either on a rotary side formed by the impeller or the supporting shafts or on a stationary side formed by the supporting frames, and a winding for the motor is mounted confronting the aforesaid magnet for the motor, so that a rotary driving section of the impeller is constructed.

By such a construction, any additional motor to be used as a rotational driving means of the impeller is not necessary to be applied to the impeller. Instead, the magnet and winding substantially performing a motor function together are disposed between the impeller and the supporting frame thereof to rotate the impeller. As a result, the cross flow type cooling fan device is greatly reduced in size, and a space for installation thereof is reduced, thereby resulting in a feasible design of compact electric appliances.

According to the invention, it is also preferable that, when the motor included between the impeller and the supporting frame is formed into a brushless motor, a control circuit section of the brushless motor is cooled making use of cooling air from the impeller by disposing the control circuit section on one side of an air guide plate. By such a construction, it is no longer necessary to provide any other cooling system for the control circuit section, which is a further advantage from the economical point of view.

According to the invention, it is further preferable that a plurality of impellers are axially coupled and the air blowing slits of the plural adjoining impellers are arranged in staggered relationship with one another. By such a construction, there is a time lag in the air blowing out of the adjoining impellers, and therefore air blowing efficiency can be improved without interference therebetween.

BRIEF DESCRIPTION OF THE DRAWINGS

FIG. 1 to FIG. 4 show a construction according to an embodiment of the present invention, in which a motor is incorporated between the end face frame and the impeller and the motor is formed into a brushless motor, and wherein:

FIG. 1 is a plan view;

FIG. 2 is a longitudinal sectional front view;

FIG. 3 is a longitudinal sectional side view; and

FIG. 4 is a sectional view showing a modification of an essential part.

FIG. 5 to FIG. 12 show another embodiment of the brushless motor, and wherein:

FIG. 5 is a schematic longitudinal sectional front view;

FIG. 6 is a schematic plan view;

FIG. 7 is a partially cutaway plan view of the essential part;

FIG. 8 is a side view;

FIG. 9 is a right side view in which field windings and hall devices for detecting a magnetic field are mounted on a printed circuit board;

FIG. 10 is a right side view showing a wiring pattern of the printed circuit board;

FIG. 11 is an electric circuitry diagram of a control circuit; and

FIG. 12 is a partial front view of a further modification.

FIG. 16 to FIG. 19 show a further embodiment illustrating the manner of disposing the control circuit section of the brushless motor, and wherein:

FIG. 16 is a plan view showing the center part of a brushless cross flow type cooling fan device;

FIG. 17 is a longitudinal sectional view taking along the line XIIV—XIIV in FIG. 16; and FIG. 18 and FIG. 19 are respectively longitudinal sectional views of a further modification;

FIG. 20 to FIG. 23 show an embodiment in which plural impellers are coupled and the air blowing slits of the impellers adjoining are arranged staggeredly one another, and wherein:

FIG. 20 is a perspective view of an external appearance of the impeller;

FIG. 21 is a perspective view of the external appearance as seen from the opposite side of FIG. 20;

FIG. 22 is a sectional view of an essential part of a cooling fan in which two impellers are used;

FIG. 23 is a sectional view of the impeller; and

Figure 1:
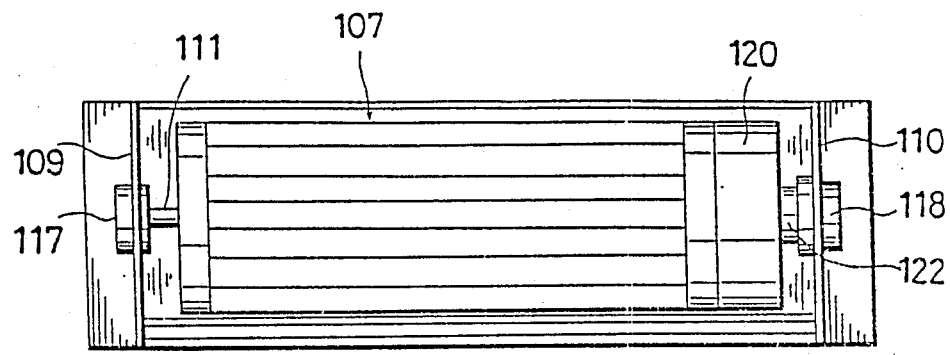
Figure 2:
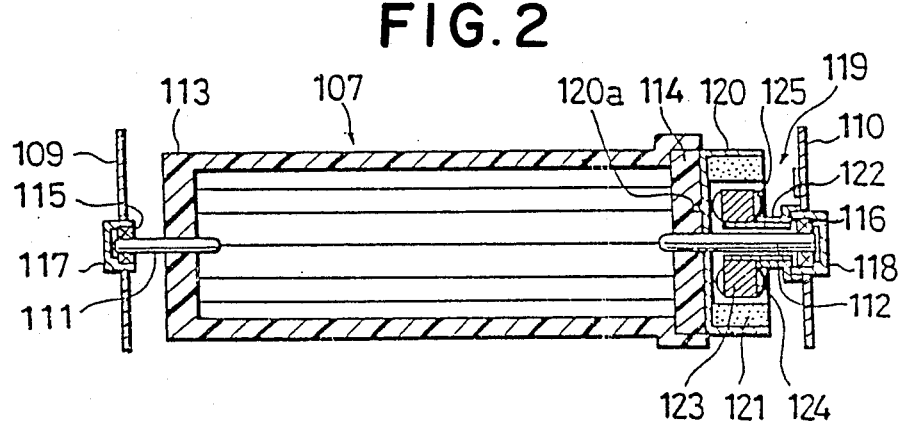
Figure 3:
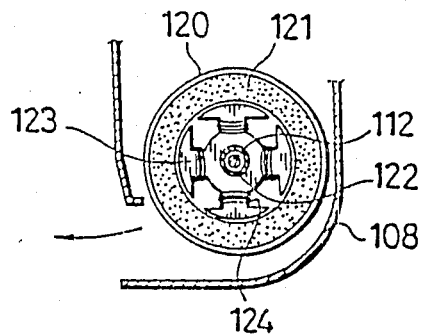

DETAILED DESCRIPTION OF THE PREFERRED EMBODIMENTS 1st Embodiment

FIG. 1 to FIG. 4 show an embodiment in which a brushless motor is disposed between the impeller and one supporting frame as a rotational driving means of the impeller.

Both ends of the impeller 107 are rotatably supported on the supporting frames 109, 110 through the supporting shafts 111, 112. Each supporting shaft 111, 112 extends through the end plate sections 113, 114, respectively, and is fixed to the end plate sections 113, 114 at both ends of the impeller to be supported on the supporting frames 109, 110 through the bearings 115, 116. Reference numerals 117, 118 denotes bearing cases.

A predetermined gap 119 is established between one end of the impeller 107 and the supporting frame 110 corresponding thereto, and a yoke 120 fixed to the end plate section 114 is arranged in the gap 119. The yoke 120 is fixed to the end plate section 114 by engaging with pressure a pin projection 120a projecting from the yoke side 120 with a hole formed in the end plate side 114. A ring magnet 121 is fixedly mounted inside the yoke coaxially with the supporting shaft 112 by some adhesive and others.

The supporting shaft 112 is covered with an outer casing 122, which is externally mounted on the bearing case 118 to be fixed to the supporting frame 110. Further, an iron core 123, which is coaxially and freely fitted in the ring magnet 121, is mounted on the outer casing 122, and the field winding 124 is wound around the aforesaid iron core 123. A hall device 125 is attached to a part of the iron core 123. The hall device 125 detects the magnet field of the rotating ring magnet 121 and controls the application of electricity to the field winding 124.

In the above construction, the impeller 107 is rotated by the application of electricity to the field winding 124 and by the cooperative operation between a magnetic field induced in the iron core 123 due to on-off control of the field winding and another magnetic field of the ring magnet 121.

Figure 4:
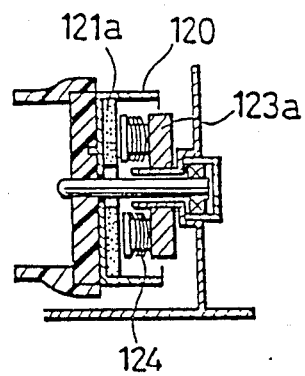

It is also preferable that, as shown in FIG. 4, the iron core 123a is designed in such a manner that the ring magnet 121 is laminated and mounted on the erected wall surface of the yoke 120, to generate a magnetic field corresponding to the ring magnet 121a. It is further preferable that the ring magnet 121 is arranged on the outer casing 122 side, while the iron core 123 is arranged on the impeller 107 side. In this construction, a slip ring is used to feed power to the rotating winding 124.

According to the construction described above, instead of using any additional motor to be connected to the impeller as rotational driving means thereof as is done in the prior art, the impeller is rotated by the ring magnet, iron core and field winding substantially performing a motor function between the impeller and the end face frame thereof. As a result, the cross flow type cooling fan device is reduced in size and the space for installation thereof is reduced, thereby compact electric appliances can be designed.

2nd Embodiment

FIG. 5 to FIG. 12 show another embodiment in which a brushless motor is disposed between the impeller and the supporting frames.

Figure 5:
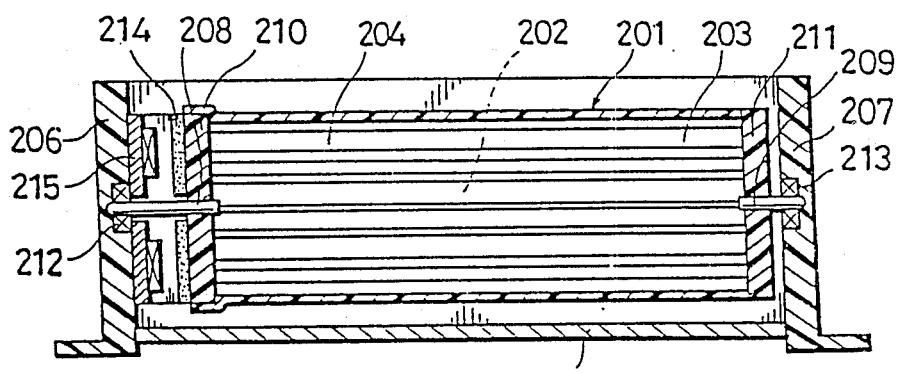
Figure 6:
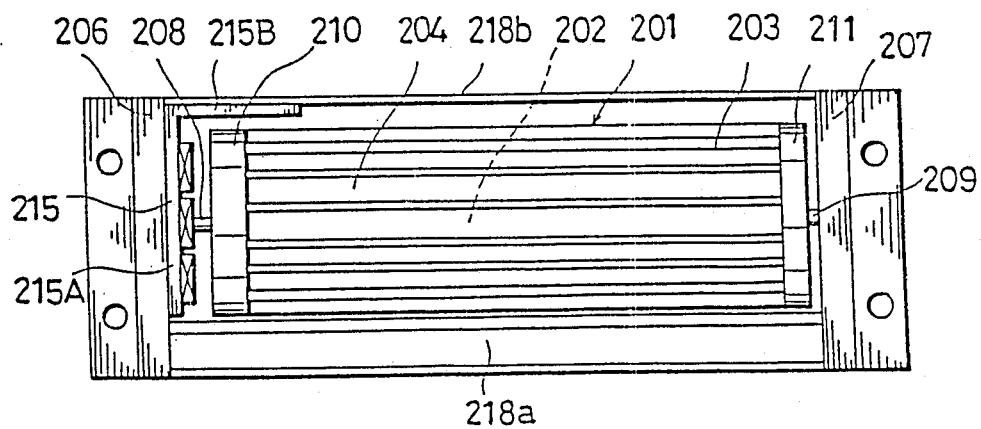
Figure 7:
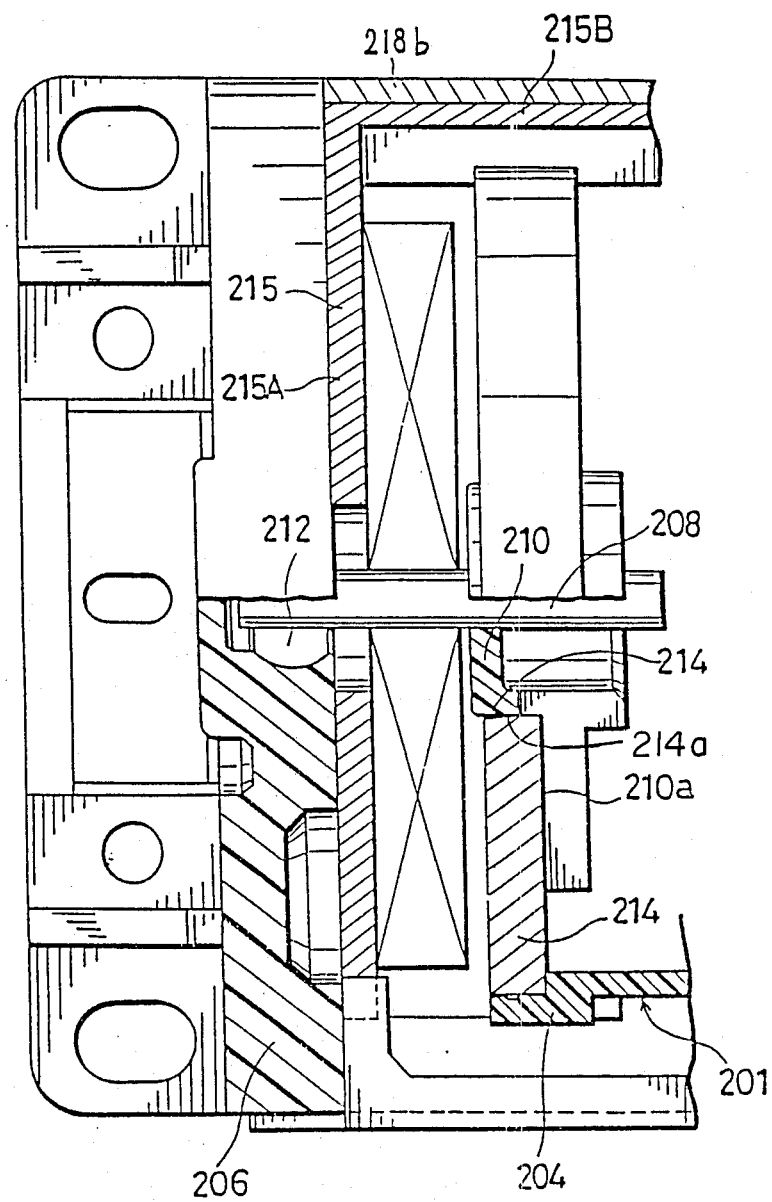

Referring to FIG. 5 to FIG. 7, a recess 210a is formed on the end face 210 of the impeller. A flat ring-shaped magnet 214 is inserted with pressure in the recess 210a, and a group of blades 204 are formed on the outer peripheral surface of the magnet 214 which is mounted in the impeller 201. The inner periphery of the magnet 214 is formed into a smaller diameter face 214a for easy insertion with pressure, and the flat magnet 214 is prevented from being broken due to the elasticity of the end face 210 of the impeller made of a synthetic resin.

Figure 9:
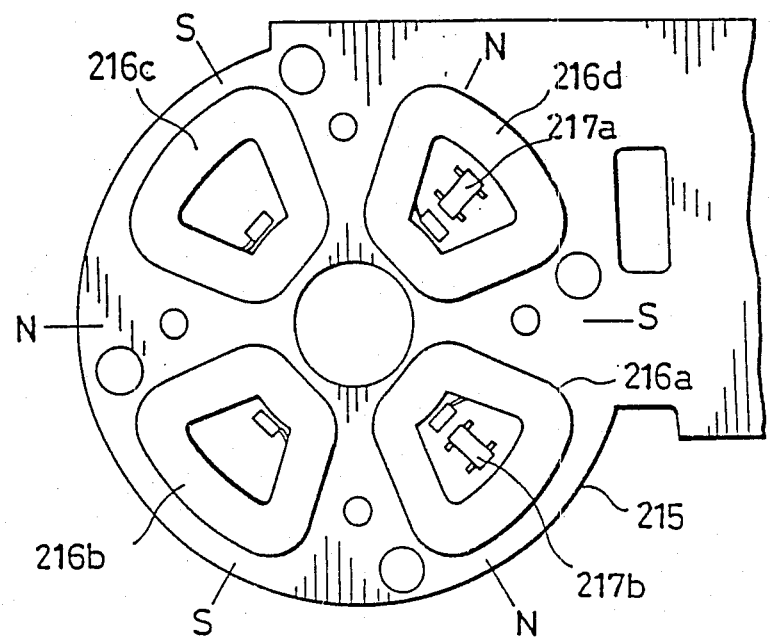
Figure 10:
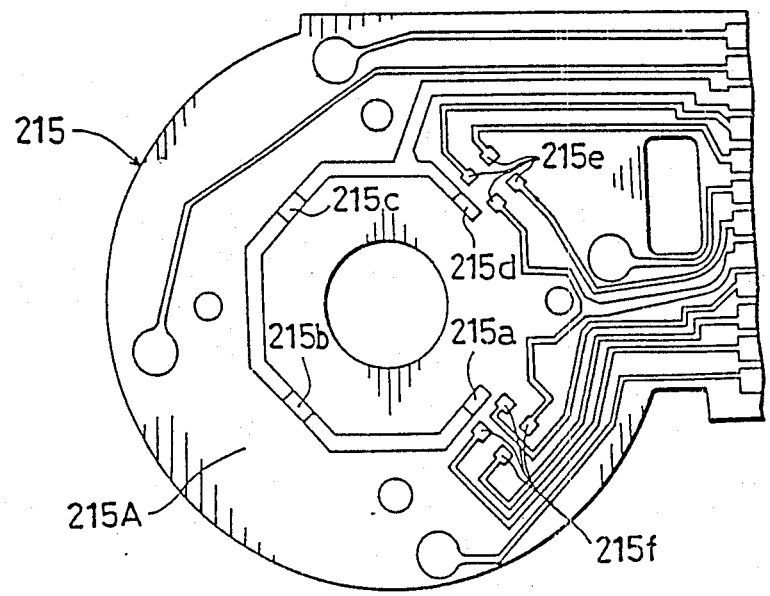

Meanwhile, a printed circuit board 215 is disposed on the inner surface of the supporting frame 206 confronting the magnet 214. A wiring pattern of the driving circuit as shown in FIG. 10 is printed on a substrate of silicon steel plate. In the wiring pattern, coil connecting section 215a–215d for the field windings are formed at four places, and hall device connecting sections 215e, 215f for magnetic field detection are formed at two places. As shown in FIG. 9, flat and almost triangular field windings 216a–216d having no iron core are connected to each of the coil connecting section 215a–215d of the printed circuit board 215, and hall devices 217a, 217b are connected to each of the hall device connecting section 215e, 215f. In the printed circuit board 215, a control circuit section 215B is curvedly and extensively provided in addition to the driving circuit section 215A. The magnet 214 has six poles, three south poles (hereinafter referred to as "S-pole" or "S-poles")) being each opposed to three north poles (hereinafter referred to as "N-pole" or "N-poles").

Figure 8:
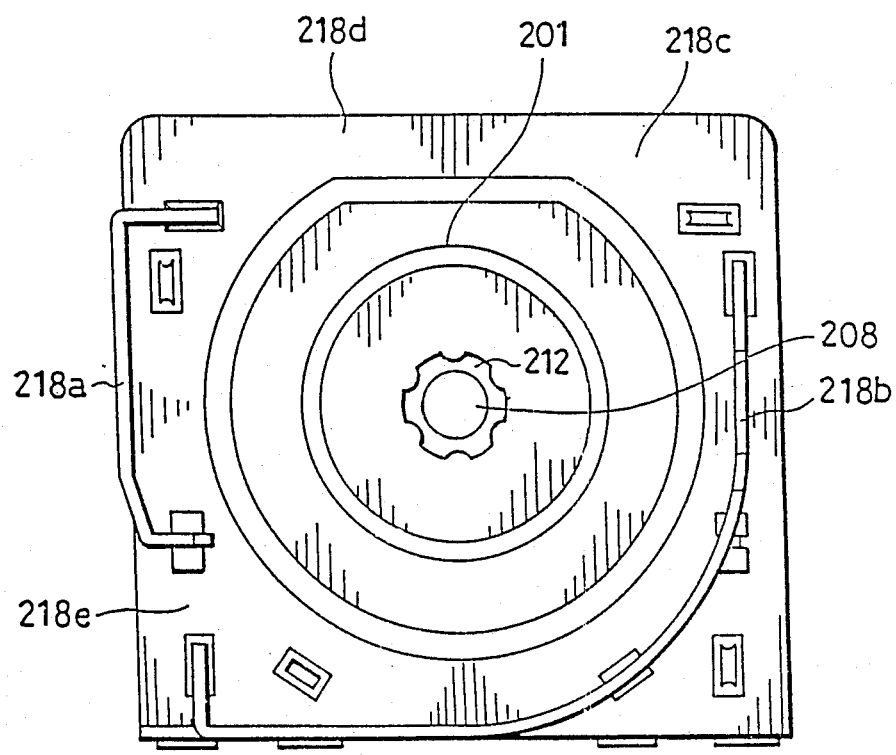

The casing for accommodating the impeller 201 comprises, as shown in FIG. 8, an almost flat housing 218a, an air guide plate 218b which is curved from the rear part to the bottom part forming a circular arc concentric with the impeller 201 and a pair of supporting frames 218c, and in which a wide air suction opening 218d is formed on the upper part, while an air discharge opening 218e is formed on one side, and the control circuit section 215B for the aforementioned printed circuit board 215 is disposed on the inner surface of the air guide plate 218b.

Figure 11:
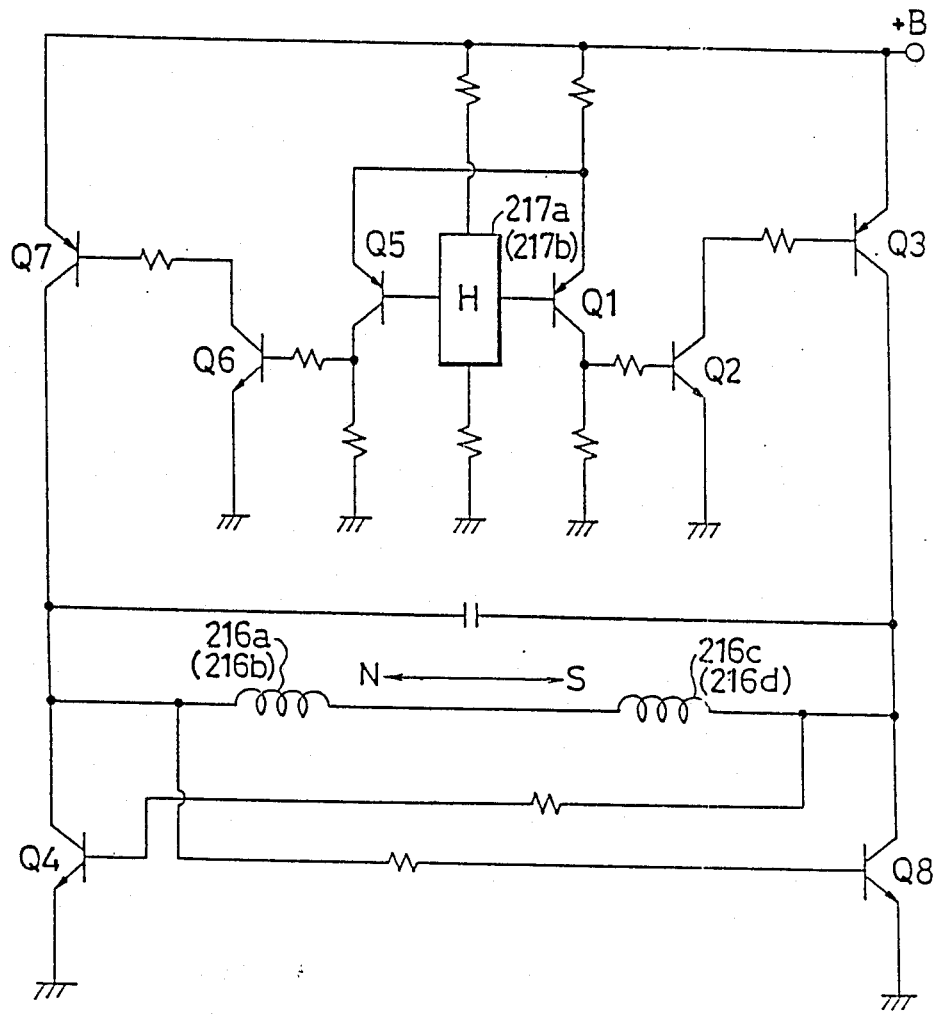

Referring now to FIG. 11, the operation of the device of the above construction according to the embodiment is described hereinafter. In this connection, there are provided two circuits corresponding to the hall devices 217a, 217b for magnetic field detection in FIG. 11, but the following description is illustratively made with respect to one of the circuits.

When the N-pole of the magnet 214 is detected by the hall device 217a for magnetic field detection, the 1st transistor Q1 of PNP type is turned on by the hall device 217a, then the 2nd to 4th transistors Q2–Q4 are respectively on, and electric current flows in the direction of the arrow N from the power source +B to the field windings 216a, 216c by way of the 3rd and 4th transistors Q3, Q4. Thus, the magnetic field of the N-pole is induced in each field winding 216a, 216c, and the magnet 214, i.e., the impeller 201 is rotated by the attractive force and repulsive force between the N-pole and the S-pole. When the hall device 217b detects the S-pole of the magnet 214 by such rotation, the 5th transistor Q5 is turned on, thereby the 6th to 8th transistors Q6–Q8 are respectively on, and the electric current flows in the direction of the arrow S to the field windings 216b, 216d by way of the 7th to 8th transistors Q7, Q8. Thus, the magnetic field of the S-pole is induced in each field winding 216b, 216d, generating thereby the attractive force and repulsive force therebetween and the magnet 214 is further rotated.

When the S-pole of the magnet 214 is detected by the hall device 217a, the 5th transistor Q5 of PNP type is turned on by the hall device 217a, then the 6th to 8th transistors Q6–Q8 are respectively on, and the current flows in the direction of the arrow S from the power source +B to the field windings 216a, 216c by way of the 7th and 8th transistors Q7, Q8. Thus, the magnetic field of the S-pole is induced in each field winding 216a, 216c and the magnet 214, i.e., the impeller 201 is rotated by the attractive force and repulsive force therebetween.

When the hall device 217b detects the N-pole of the magnet 214 by such rotation, the 1st transistor Q1 is turned on, thereby the 2nd to 4th transistors Q2–Q4 are respectively on, and the electric current flows in the direction of the arrow N to the field windings 216b, 216d by way of the 3rd to 4th transistors Q3, Q4. Thus, the magnetic field of the S-pole is induced in each field winding 216b, 216d, generating thereby the attractive force and repulsive force therebetween, and the magnet 214 is further rotated. The same operation is repeated thereafter to keep the impeller 201 rotating.

In the operation, since the printed circuit board 215 in which the field windings 216a–216d are disposed are formed of a silicon steel plate, core loss is reduced. The control of electricity application to each field coil 216a–216d in accordance with the detection of the field of the magnet 214 by the aforementioned hall devices 217a, 217b is carried out by the control circuit section 215B of the printed circuit board 215.

In this manner, a motor function is substantially performed by the magnet 214 and each field winding 216a–216d, and therefore any additional brushless motor to be used as a driving means for the impeller 201 is no longer necessary. Further, the brushless motor section is composed of the flat field windings 216a–216d without an iron core, the magnet 214 and the printed circuit board 215, and the magnet 214 is mounted inside the impeller 201. Therefore, the motor section can be greatly reduced in size. Moreover, since the field windings 216a–216d are disposed on the printed circuit board 215, it is possible to use a sheet coil and to provide the field windings 216a–216d and the hall devices 217a, 217b on the same driving circuit section 215A of the printed circuit board 215.

Figure 12:
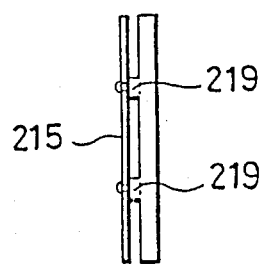

If the driving circuit section 215A and the control circuit section 215B are separately provided, such troublesome work as soldering these sections for connection to each other will be needed, and such other components as lead wire, connectors, will be further necessary, thereby rendering a compact design impossible. Such a problem is overcome by forming the driving circuit section 215A and the control circuit section 215B integrally on the printed circuit board 215 as in this embodiment. There is no dead space in practical use by disposing the control circuit section 215B inside the air guide plate 218b. Integration is further improved by using a double side printed circuit board as the printed circuit board 215. The same advantage can be attained by using a flexible board as the printed circuit board 215 or by disposing the control circuit section 215B of the printed circuit board 215 on the outer surface of the supporting frame or by wiring the driving circuit section and the control circuit section formed on separate boards through a folding type connector. In FIG. 12, attaching bosses 219 are provided in the places for attaching such members as support frame, air guide plate, etc. By inserting the bosses 219 through fitting apertures formed on the printed circuit board 215 and compressively flattening the top ends of the bosses 219 by heating, perfect insulation is obtained without any insulating sheet or the like, and the firm fitting is achieved.

Under certain circumstances, only one hall device 217a or 217b for magnetic field detection may be sufficient for the purpose. The magnet 214 can be also provided inside the end face 210 of the impeller. Further, the number of poles of the magnet 214 and the field windings 216a–216d can be freely selected as a matter of course.

Figure 13:
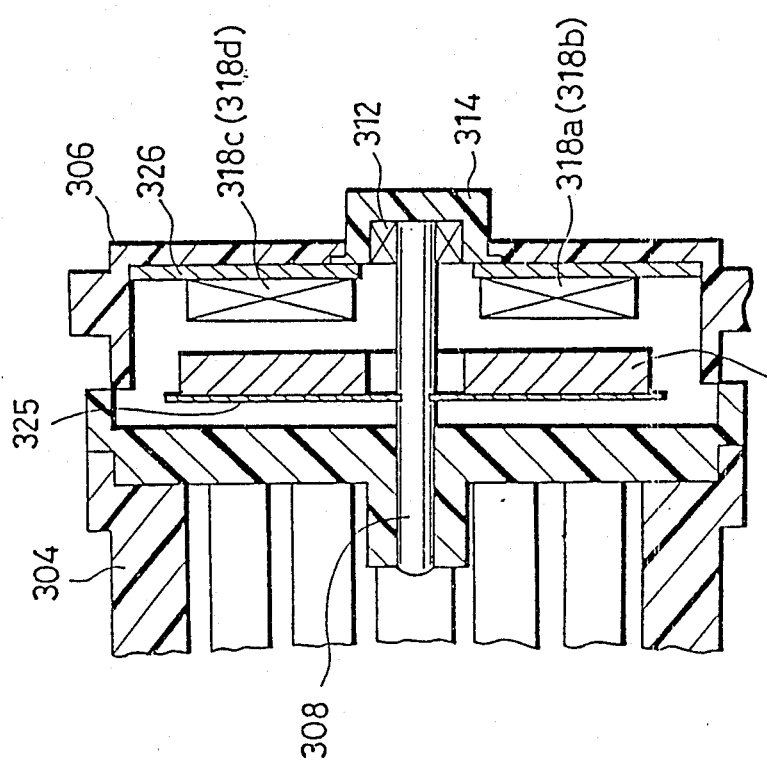
FIG. 13 is a sectional view of an essential part of a further embodiment of the brushless motor.

In addition, the magnet 214 for the motor is disposed on the end face side of the impeller 201 in the foregoing embodiment, but it is also satisfiable that, as shown in FIG. 13, the magnet 324 for the motor are mounted on the supporting shaft 308. In such a construction, a holding member 325 alone is fixed to the supporting shaft 308 supported on the supporting frame 306, and the magnet 324 for the motor is mounted on the supporting member 325. The field windings 318a–318d for the motor are connected, at equal distances in circumferential direction, to each coil connecting sections (not shown) of the same printed circuit board 326 as the foregoing embodiment and disposed inside the supporting frame 306. The remaining construction is substantially the same as the foregoing embodiment. The impeller 304 can be rotationally driven by the aforementioned brushless motor method also in such a construction. In the drawing, numeral 312 denotes a bearing.

As described above, the impeller is rotated by disposing the magnet and the field windings substantially performing a motor function between the impeller and the supporting frame, and the magnet is laminated as thin as possible to be disposed inside the impeller or around the supporting shaft. Furthermore, since the flat field windings without an iron core are disposed on the same printed circuit board together with the magnetic field detecting devices, the impeller driving source can be considerably thinner, small-sized and lightweight, and space for installment is greatly reduced. As a result, quite compact electic appliances can be successfully designed.

In this connection, the field windings used in the embodiment described above are of coils without an iron core, but the coils with iron cores can also be used as a matter of course. In this case, the magnet for the motor is satisfiably held confronting the iron core.

3rd Embodiment

Figure 14:
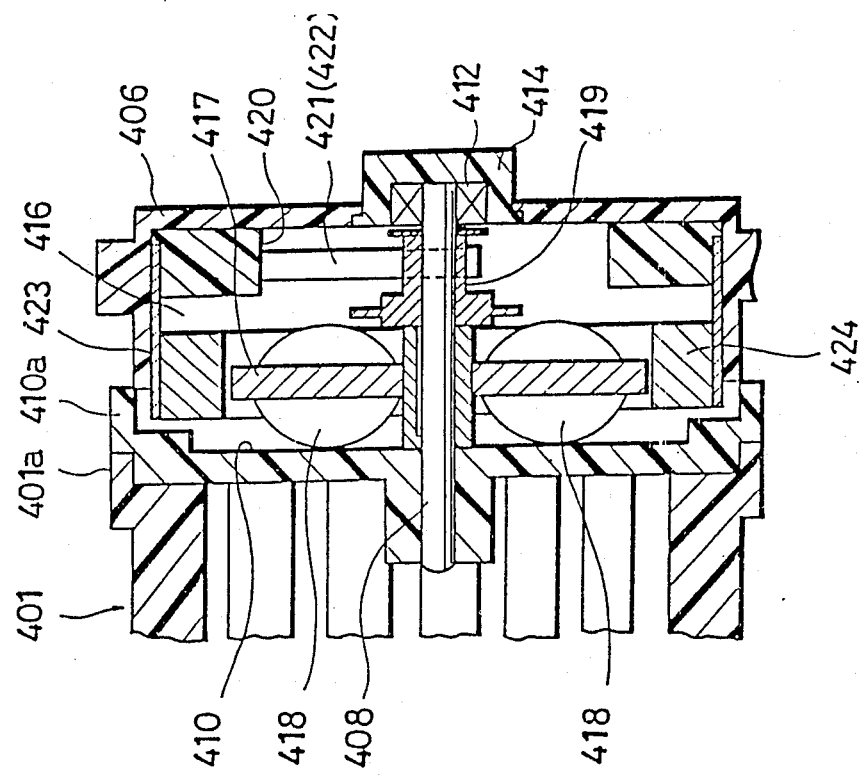
FIG. 14 is a sectional view of an essential part of a construction in which a motor is incorporated between one end face frame and the impeller, and the motor is formed into a motor with a brush.

FIG. 14 shows an embodiment in which a motor having brushes is disposed between the impeller and the supporting frame.

In this embodiment, in the gap 416 formed between the supporting frame 406 and the end face 410 of the impeller 401, the iron core 417 is fixed to the supporting shaft 408, and the winding 418 for the motor is wound around the iron core 417. The winding 418 is held on the supporting shaft 408 through the iron core 417. A rectifier 419 is engaged with the supporting shaft 408 outward from the iron core 417, i.e., on the bearing 412 side, and a rectifying piece (not shown) of the rectifier 419 is connected to the winding 418 for the motor. Meanwhile, a mount 420 is fixed on the inner peripheral side of the holding frame 406, and a pair of brushes 421, 422 are supported on the mount 420 so as to come in contact with the rectifier 419 at symmetrical positions respectively. Power is supplied from a power source to the area between the pair of brushes 412, 422 by way of a lead wire (not shown) provided through the supporting frame 406.

A cylindrical frame 423 of a magnetic material is mounted on the inner peripheral surface of the peripheral wall of the supporting frame 406 being held between the wall and the mount 420. An annular magnet 424 for the motor with its N-pole and S-pole alternately arranged is fixed at a position inside the frame 423 confronting the iron core 417. The frame 423 is mounted on the supporting frame 406 facing the inner peripheral side of the peripheral wall 410a formed on the edge of the end face 410 of the impeller, thereby preventing dust from entering the gap 416.

The frame 423 is desired to be of a magnetic material in view of reducing magnetic resistance, but a non-magnetic material is also satisfiable. The magnet 424 for the motor is not limited to the annular one, but any other magnet divided into N-pole and S-pole and held on a non-magnetic material is also applicable. Moreover, the number of poles can be freely selected in the same way as the winding for the motor.

According to the cross flow type cooling fan device of the above arrangement, the supporting shaft 408, i.e., the impeller 401 is rotated by the attraction and repulsion due to the electromagnetic force which is generated when supplying power from the power source to the area between the brushes 421, 422 and applying electric current to the field winding 418, and due to the electromagnetic force of the magnet 424 for the motor.

4th Embodiment

Figure 15:
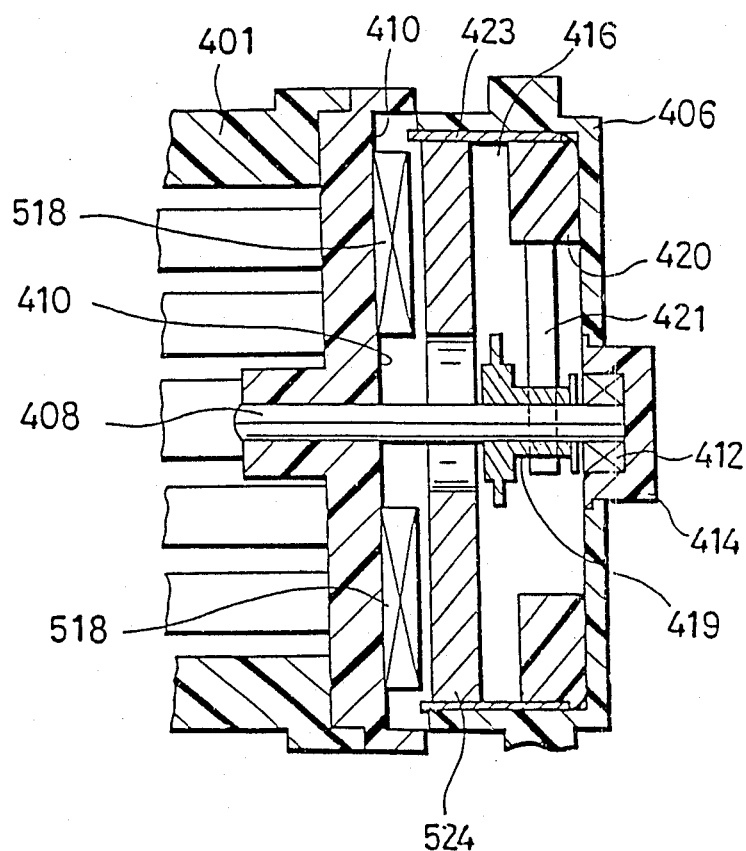
FIG. 15 is a sectional view of an essential part of a construction according to a further embodiment in which a motor with brush is used.

FIG. 15 shows a further embodiment in which a motor having brushes is disposed between the impeller and the supporting frame.

In this embodiment, in the same manner as the foregoing 3rd Embodiment, the field winding for the motor is held on the supporting shaft 408, and the magnet for the motor is held on the supporting frame 406. In FIG. 15, a flat winding 518 without an iron core connected to the rectifier 419 is mounted on the end face 410 of the impeller 401, while a flat disc magnet 524 for the motor is mounted on the frame 423 confronting the aforesaid winding 518 for the motor. That is to say, the winding 518 for the motor is held on the end face 410 of the impeller in this embodiment. The remaining construction is the same as the foregoing embodiment shown in FIG. 14, and the same reference numerals are designated for like parts. The operation to rotate the impeller 401 is the same as the foregoing 3rd embodiment as a matter of course.

5th Embodiment

FIG. 16 to FIG. 19 show an embodiment in which the control circuit section of the brushless motor is disposed on one side of the air guide plate.

Figure 16:
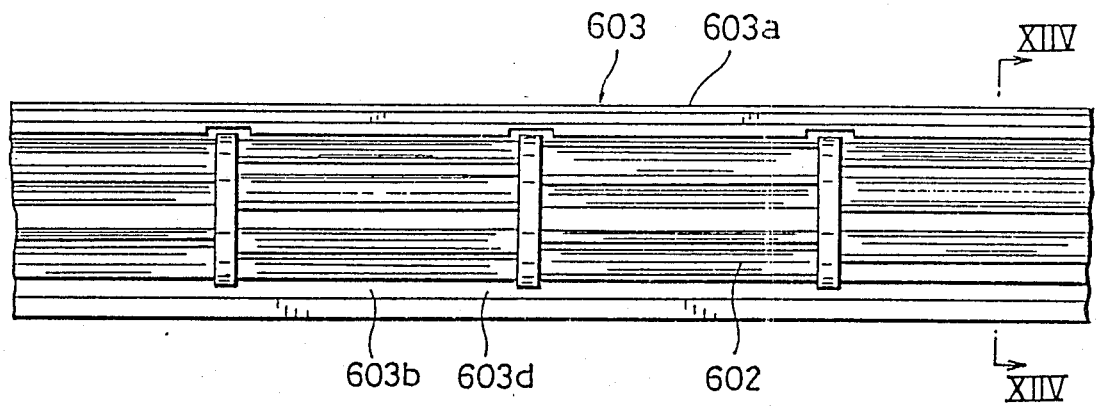
Figure 17:
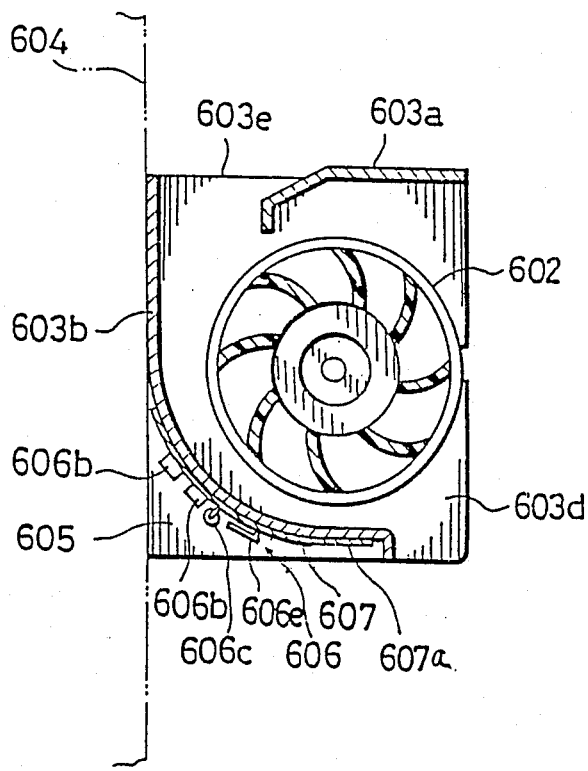

The impeller 602 is accommodated in a casing 603 so as to be freely rotated by the supporting shaft, bearing and the supporting shaft of the brushless motor in the same manner as each of the foregoing embodiments. As shown in FIG. 16 and FIG. 17, the casing 603 comprises an almost flat housing 603a, an air guide plate 603b whose middle part is curved forming a circular arc concentric with the impeller 602, and a pair of supporting frames (not shown), and in which a wide air suction opening 603d is formed on one side, while an air discharge opening 603e is formed on the other side. A flexible board 607 is attached to the outside of the air guide plate 603b forming a circular arc by an adhesive or others.

Figure 18:
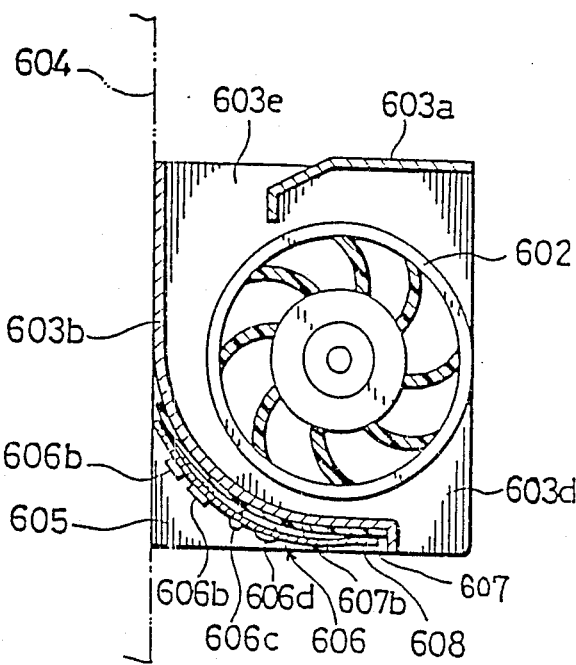

The casing 603 of the above construction is attached to a chassis 604 of a main body of such apparatus as a copying machine, electromagnetic cooking table, personal computer, wordprocessor, etc., and a space 605 is formed between the air guide plate 603b and the chassis 604. The control circuit section 606 including electronic components is disposed in this space 605. The control circuit section 606 comprises chipped transistors 606b, a resistor 606c, a condensor 606d, diode 606e, etc., each welded to the surface 607a of the flexible board 607. With regard to the manner of attaching the flexible board 607 to the outside of the air guide plate 603b and the manner of fitting the electronic components 606b–606e to the flexible board 607, as shown in FIG. 18 for example, first an insulating sheet 608 (e.g., a resin sheet) is pasted on the external surface of the air guide plate 603b, then the flexible board 607, to the back side 607b of which the lead section of the electronic components 606b–606e of the control circuit section 606 is welded, is attached to the insulating sheet 608 by some fixing means such as adhesive. This manner is useful particularly when the flexible board 607 is welded at the back side 607b thereof.

Figure 19:
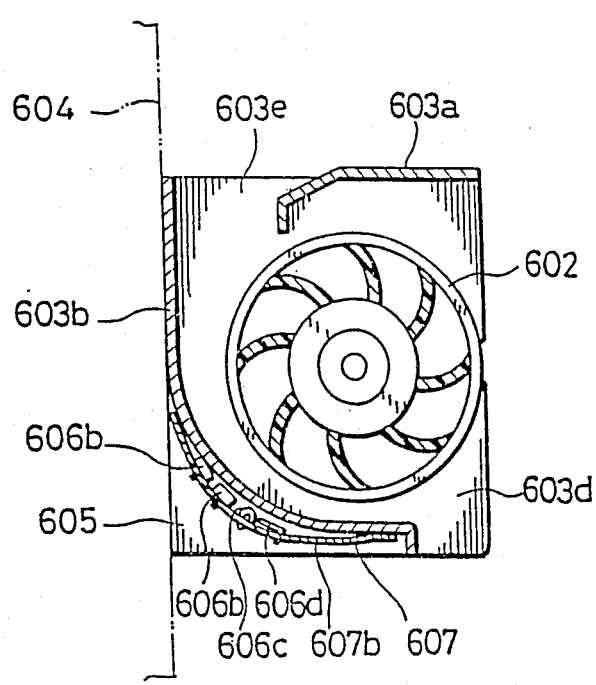

With regard to the manner of attaching the flexible board 607 to the outside of the air guide plate 603b and the manner of fitting the electronic components 606b–606e to the flexible board 607. It is also satisfiable that, as shown in FIG. 19, the flexible board 607, to the back side 607b of which the lead section of the electronic components 606b–606e is welded, is added to the external surface of the air guide plate 603b by an adhesive, so that the electronic components 606b–606e are in contact with the external surface of the air guide plate 603b or located near thereto.

In such a construction, since the electronic components 606b–606e of the control circuit section 606 are in contact with or located near the air guide plate 603b, the electronic component 606b–606e are cooled by the air guide plate 603b which is cooled by the air sent from the impeller 602. Thus, the electronic components are effectively prevented from being damaged due to thermal influence, and durability and reliability of the brushless cross flow type cooling fan device can be considerably improved.

In the construction described above, when the brushless motor is rotationally driven by switching on the control circuit section 606 which controls the switching of the brushless motor and feeding the power to the brushless motor driving section from the control circuit section 606, the impeller 602 accommodated in the casing 603 is rotated, thereby air is drawn through the wide opening 603d and is discharged through the narrow opening 603e in the casing 603. Since the control circuit section 606 is disposed in the space 605 separated from the brushless motor the electronic components 606b–606e are protected from thermal influence at the time of driving the brushless motor. As a result, the durability and reliability of the brushless motor, in other words, the durability and reliability of the brushless cross flow type cooling fan device can be improved.

6th Embodiment

FIG. 20–23 show an embodiment in which air blowing efficiency is improved, when a plurality of impellers are connected in the axial direction.

Figure 20:
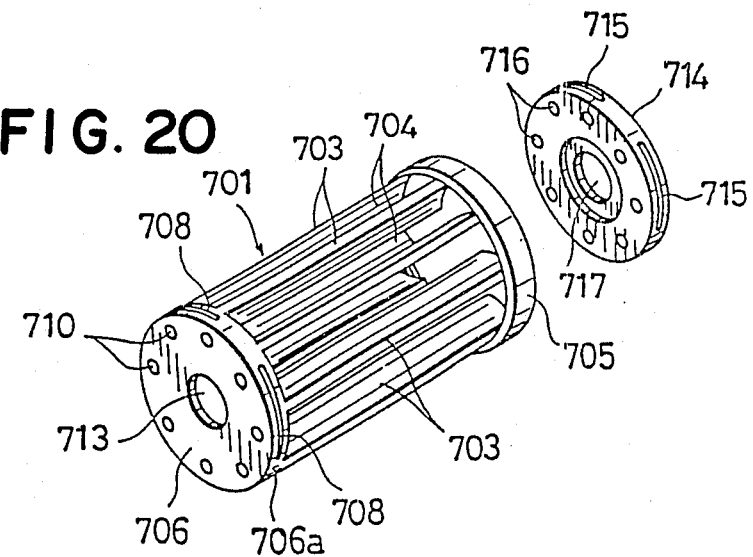
Figure 21:
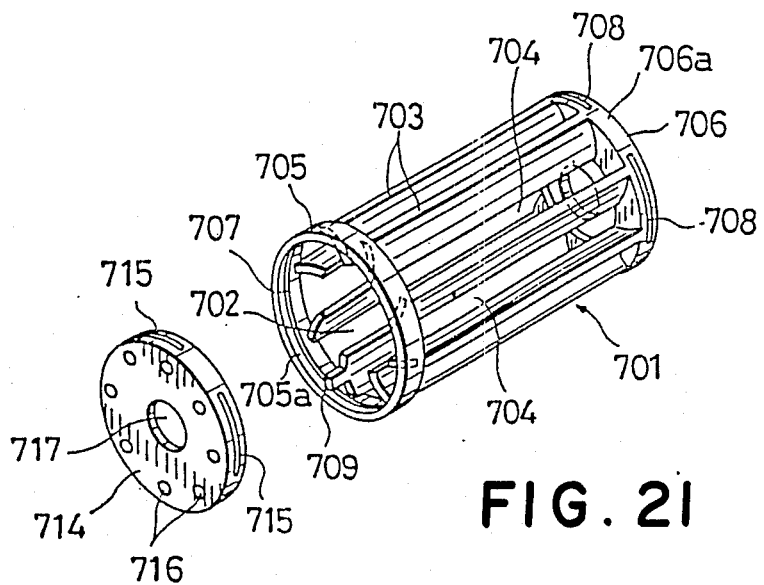

The impeller 701 shown in FIG. 20 and FIG. 21 is solidly formed of a synthetic resin, and the cylindrical peripheral wall comprises a plurality of blades 703 disposed with certain distances around the hollow area 702 in the center of the cylindrical body, and a plurality of air blowing slits 704 opened between the respective blades 703, 703 adjoining each other. Each blade 703 has an inclination of approx. 60 degrees approx. with respect to the cylindrical peripheral wall to improve the air blowing efficiency from the air blowing slits 704.

The aforesaid group of blades 703 are supported by the annular coupling section 705 at one end, while by the end plate section 706 at the other end. Accordingly, the impeller 701 is designed to be an almost cylindrical member with its one end open, and the diameter of the inner peripheral surface 705a of the annular coupling section 705 so established as to be equal to the outer peripheral surface 706a of the end plate section 706 to meet the multiple connection of the impellers. Further, a depressed section 707 being annularly or intermittently joined to the aforesaid inner peripheral surface 705a is concavedly formed, while a raised section 708 being annularly or intermittently joining to the outer peripheral surface 706b of the end plate section is formed as shown in the drawing. Of course the location of the depressed section 707 and the raised section 708 can be replaced with each other.

In the annular coupling section 705, a positioning projection 709 shown in FIG. 21 is provided. The positioning projection 709 projects from the end of one blade 703, while a plurality of engaging apertures 710 are provided circumferentially on the end plate section 706 at the same radial positions as the projections 709. In the center of the end plate 706, a circular hole 713 is opened to engage a bearing member of the supporting shaft described later therewith.

Figure 22:
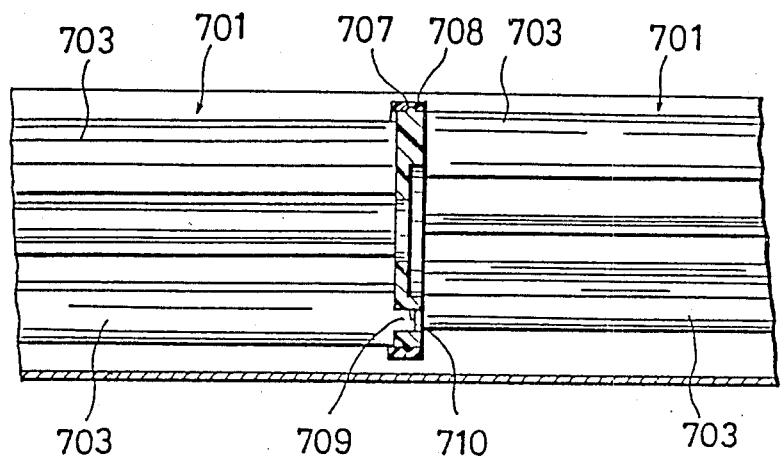

As shown in FIG. 22, for the multiple connection of the impellers, the end plate section 706 of one impeller is inserted with pressure in the annular coupling section 705 of the other impeller so that the depressed section 707 and the raised section 708 of both impellers are engaged with each other. At this time, the positioning projection 709 is inserted in any one of the engaging apertures 710 in the annular coupling section 705.

Figure 23:
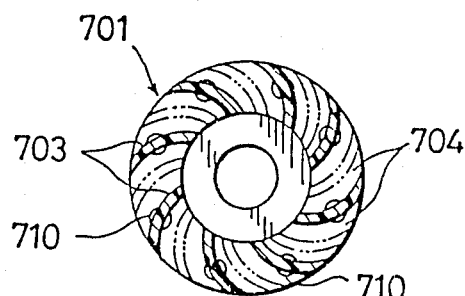
Figure 24:
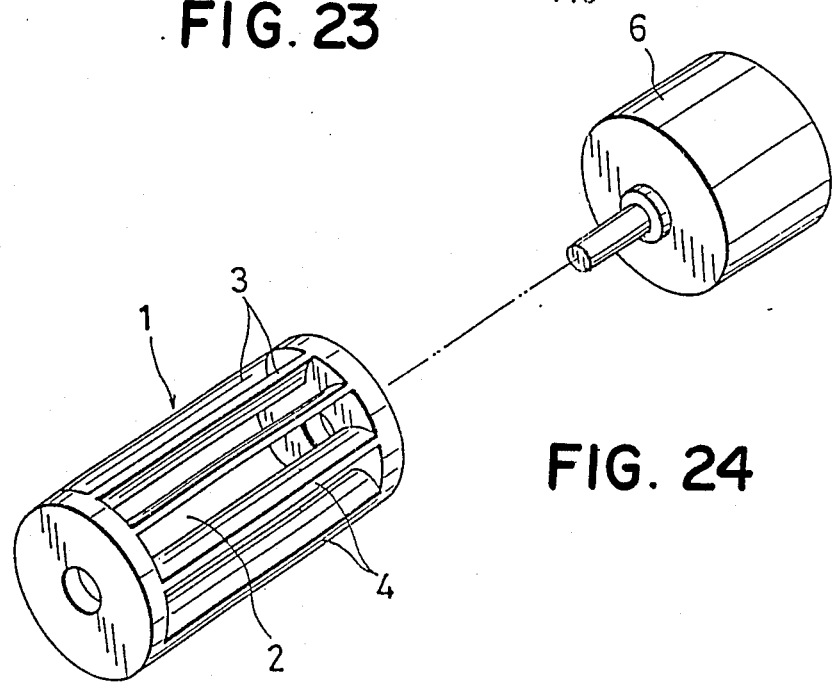
FIG. 24 is a perspective view showing a manner of use according to the prior art by combining an impeller with a motor.

By the aforesaid positioning arrangement, connection between the two impellers is regulated in such a manner that the blades 703, 703 adjoining each other, i.e., the adjacent air blowing slits 704, 704 do not stand linearly in a row in the axial direction, but are arranged in a staggered manner with one another as is shown in a relation between the solid line and the two-dot chain line in FIG. 23.

In this manner, the two impellers are connected in the axial direction making their length twice as long as one impeller. When necessary to obtain a length three times as long as one impeller, just connecting three impellers is sufficient, thus the impeller connection of required dimensions can be optionally arranged.

The annular coupling section 705 of the impeller located at the extremity of the foregoing connection is closed with the auxiliary end plate 714 which is a separate member as shown in FIG. 20 and FIG. 21. Accordingly, the auxiliary end plate 714 is also provided with the raised section 715 to be fitted with pressure in the depressed section 707 of the annular coupling section 705, the engaging apertures 716 corresponding to the positioning projection 709, and a circular hole 717 in the center part in the same manner as the end plate section 706. A bearing member (not shown) made of a rubber or the like material is engaged with the circular hole 717 of the auxiliary end plate 714 when attaching the auxiliary end plate 714, then the bearing member is supported by the supporting shaft, thus the cross flow type cooling fan device is constructed.

In the cooling fan device according to this embodiment, since the air blowing slits 704 are so disposed as to be alternately staggered with one another as described above, a time lag is assured between the air blowing from the air blowing slits 704 of one impeller and that from the air blowing slits 704 of the other impeller, without interference therebetween.

As has been explicit from the above description, when assembling a cooling fan in the form of a multiple connection, the connection between one impeller and the other can be carried out very simply at a touch, i.e., by engaging with pressure the raised section with the depressed section, moreover centering is automatically carried out as the result of such engagement. Accordingly, cooling fans of high accuracy can be mass-produced at reasonable cost. Furthermore, since the accuracy in centering is improved, the cooling device is well-balanced in rotation. Moreover, the disassembling becomes easy resulting in easy maintenance thereof.

In addition, since the positional relation in the connection between the two impellers is automatically regulated just by engaging the positioning projection with the engaging apertures, labor necessary for the regulation is saved, and interference among the laminar air flows sent from each impeller is prevented, thereby pulsation loss being eliminated.

INDUSTRIAL APPLICABILITY

As has been described so far, the cross flow type cooling fan device according to the present invention is applicable to the internal cooling device of audio amplifiers, microcomputers, wordprocessors, copying machines, electromagnetic appliances, etc., and in particular under the recent trend of compact electric appliances having smaller space for installing the cooling fan, the invention is preferable in designing compact electric appliances.

We claim:
1. A cross flow type cooling fan device, comprising:
   a pair of spaced apart stationary supporting frames;
   a plurality of aligned cylindrical bodies, each having a greater length than diameter and each defining a hollow central area and air blowing slits in its lengthwise direction around the hollow central area, each cylindrical body thereby serving as an impeller, and the blowing slits of the respective respective cylindrical bodies are arranged to be staggered relative to each other;

means for rotatably supporting each end of the aligned cylindrical bodies to a respective supporting frame; and a magnet and a winding confronting the magnet which together serve as a motor for rotatably driving the impellers, said magnet and winding being separately mounted to the device.

2. The cross flow type cooling fan device as defined in claim 1, wherein the magnet is mounted on one of the impellers.

3. The cross flow type coding fan device as defined in claim 1, wherein the means for rotatably supporting each end of the aligned cylindrical bodies comprises a shaft at each said end, and wherein the magnet is mounted on one of said shafts.

4. The cross flow type cooling fan device as defined in claim 1, wherein the magnet is mounted on one of said supporting frames.

5. The cross flow type cooling fan device as defined in claim 1, wherein the magnet is mounted on one of the impellers so that it faces a supporting frame, and the winding is mounted on said facing supporting frame, said magnet and winding forming a brushless motor.

6. The cross flow type cooling fan device as defined in 5, further comprising:

an arc-shaped air guide plate which surrounds the impellers from a bottom part to a rear part thereof; and a control circuit for the motor disposed on one side of said arc-shaped air guide plate such that said control circuit is cooled by the air from the impellers directed thereto by said arc-shaped air guide plate.

7. The cross flow type cooling fan device as defined in claim 1, wherein the means for rotatably supporting each end of the aligned cylindrical bodies comprises a shaft at each said end, and wherein the magnet is mounted on one of said shafts, and the winding is mounted on a corresponding supporting frame, said magnet and winding forming a brushless motor.

8. The cross flow type cooling fan device as defined in claim 1, wherein the winding is mounted on one of the impellers so that it faces a supporting frame, and the magnet is mounted on said facing supporting frame.

9. The cross flow type cooling fan device as defined in claim 8, further comprising:

an arc-shaped air guide plate which surrounds the impellers from a bottom part to a rear part thereof; and a control circuit for the motor disposed on one side of said arc-shaped air guide plate such that said control circuit is cooled by the air from the impeller directed thereto by said arc-shaped air guide plate.

10. The cross flow type cooling fan device as defined in claim 1, wherein the means for rotatably supporting each end of the aligned cylindrical bodies comprises a shaft at each said end, and wherein the winding is mounted on one of said shafts, and the magnet is mounted on a corresponding supporting frame.

* * * * *

UNITED STATES PATENT AND TRADEMARK OFFICE
CERTIFICATE OF CORRECTION

PATENT NO. : 4,859,888,

DATED : August 22, 1989

INVENTOR(S) : Ohbayashi et al

It is certified that error appears in the above-identified patent and that said Letters Patent is hereby corrected as shown below:

Claim 1, column 11, line 3, delete "respective".

Claim 9, column 12, line 26, change "impeller" to --impellers--.

Signed and Sealed this

Ninth Day of October, 1990

Attest:

HARRY F. MANBECK, JR.

*Attesting Officer*   *Commissioner of Patents and Trademarks*